(12) United States Patent
Obermann et al.

(10) Patent No.: US 12,194,610 B2
(45) Date of Patent: Jan. 14, 2025

(54) MAXIMUM POWER TOOL STARTUP TORQUE

(71) Applicant: MILWAUKEE ELECTRIC TOOL CORPORATION, Brookfield, WI (US)

(72) Inventors: Timothy R. Obermann, Waukesha, WI (US); Douglas R. Fieldbinder, Greendale, WI (US); Ian A. Duncan, Colgate, WI (US); Robert Turney, Watertown, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/691,339

(22) PCT Filed: Sep. 9, 2022

(86) PCT No.: PCT/US2022/043028
§ 371 (c)(1),
(2) Date: Mar. 12, 2024

(87) PCT Pub. No.: WO2023/043664
PCT Pub. Date: Mar. 23, 2023

(65) Prior Publication Data
US 2024/0261956 A1    Aug. 8, 2024

Related U.S. Application Data

(60) Provisional application No. 63/244,314, filed on Sep. 15, 2021.

(51) Int. Cl.
B25F 5/02      (2006.01)
B25F 5/00      (2006.01)
(Continued)

(52) U.S. Cl.
CPC .............. B25F 5/02 (2013.01); B25F 5/001 (2013.01); H02P 6/08 (2013.01); H02P 6/30 (2016.02)

(58) Field of Classification Search
CPC .... B25F 5/02; B25F 5/001; H02P 6/30; H02P 6/08
See application file for complete search history.

(56) References Cited

U.S. PATENT DOCUMENTS 6,836,614 B2 * 12/2004 Gilmore ................. B25F 5/001
                                                            173/4
7,112,934 B2 *  9/2006 Gilmore ................. B25B 21/00
                                                          318/434
(Continued)

FOREIGN PATENT DOCUMENTS

CN      102788134 A    11/2012
JP      H09277195 A    10/1997
(Continued)

OTHER PUBLICATIONS

International Search Report and Written Opinion for Application No. PCT/US2022/043028 dated Jan. 13, 2023 (8 pages).

*Primary Examiner* — Nathaniel C Chukwurah
(74) *Attorney, Agent, or Firm* — Michael Best & Friedrich LLP

(57) ABSTRACT

A power tool including a housing, an input, a gear train, a motor at least partially supported by the housing and coupled to the gear train, and a controller including a processor and a memory. The controller is coupled to the input and the motor and is configured to receive an input signal from the input, determine an operating direction and an operating speed based on the input signal, cause the motor to rotate the gear train in a direction opposite the (Continued)

operating direction for a predetermined amount of rotation, and cause the motor to rotate in the operating direction at the operating speed.

20 Claims, 16 Drawing Sheets

(51) Int. Cl.
*H02P 6/08* (2016.01)
*H02P 6/30* (2016.01)

(56) References Cited

U.S. PATENT DOCUMENTS

| | | | |
|---|---|---|---|
| 9,266,178 B2* | 2/2016 | Eshleman | ................ B25F 5/00 |
| 2016/0089734 A1* | 3/2016 | Eshleman | ............... B23B 5/167 |
| | | | 81/57.36 |
| 2021/0078151 A1 | 3/2021 | Huber et al. | |

FOREIGN PATENT DOCUMENTS

| JP | 2008055580 A | 3/2008 |
|---|---|---|
| JP | 2017500214 A | 1/2017 |

\* cited by examiner

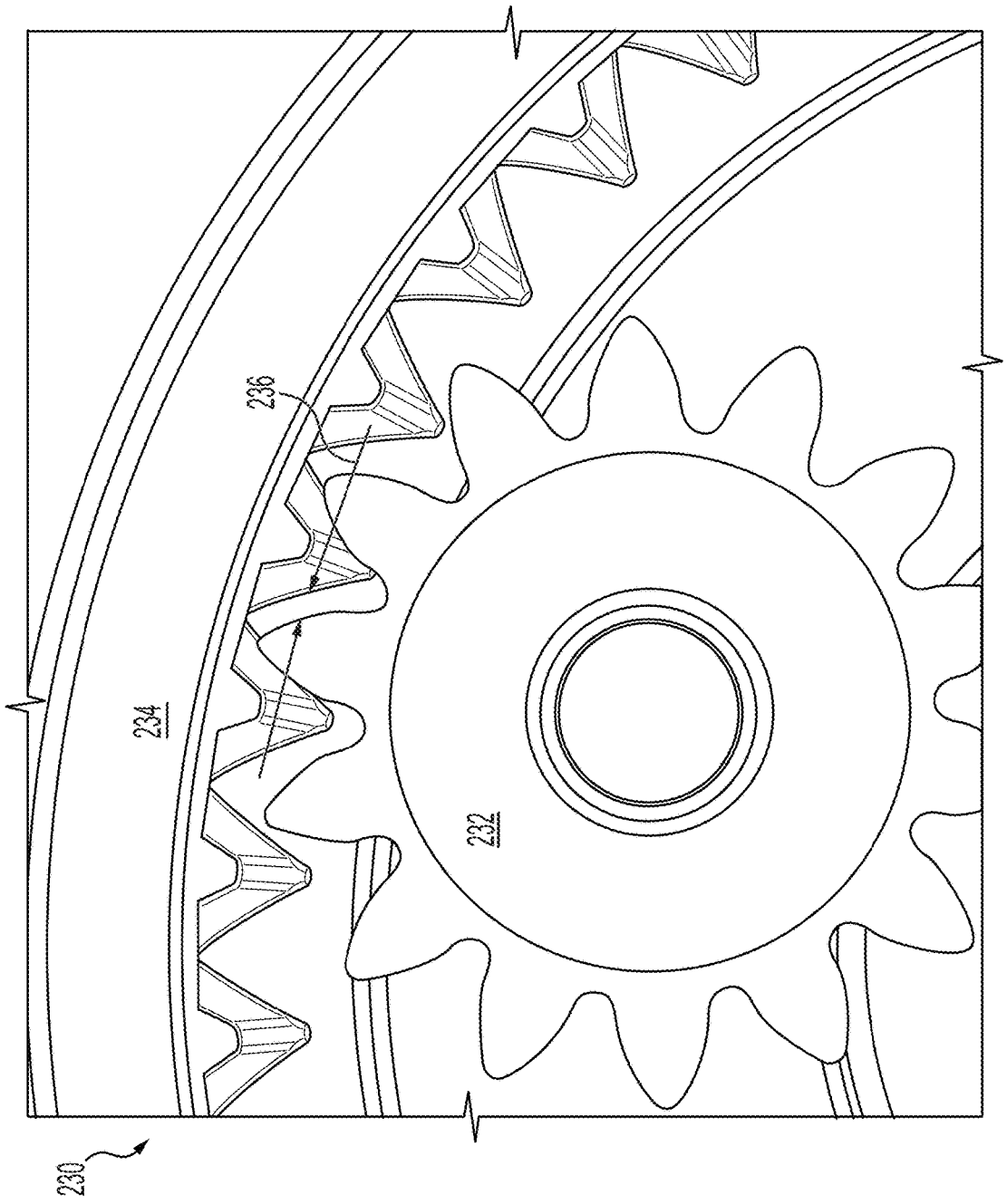

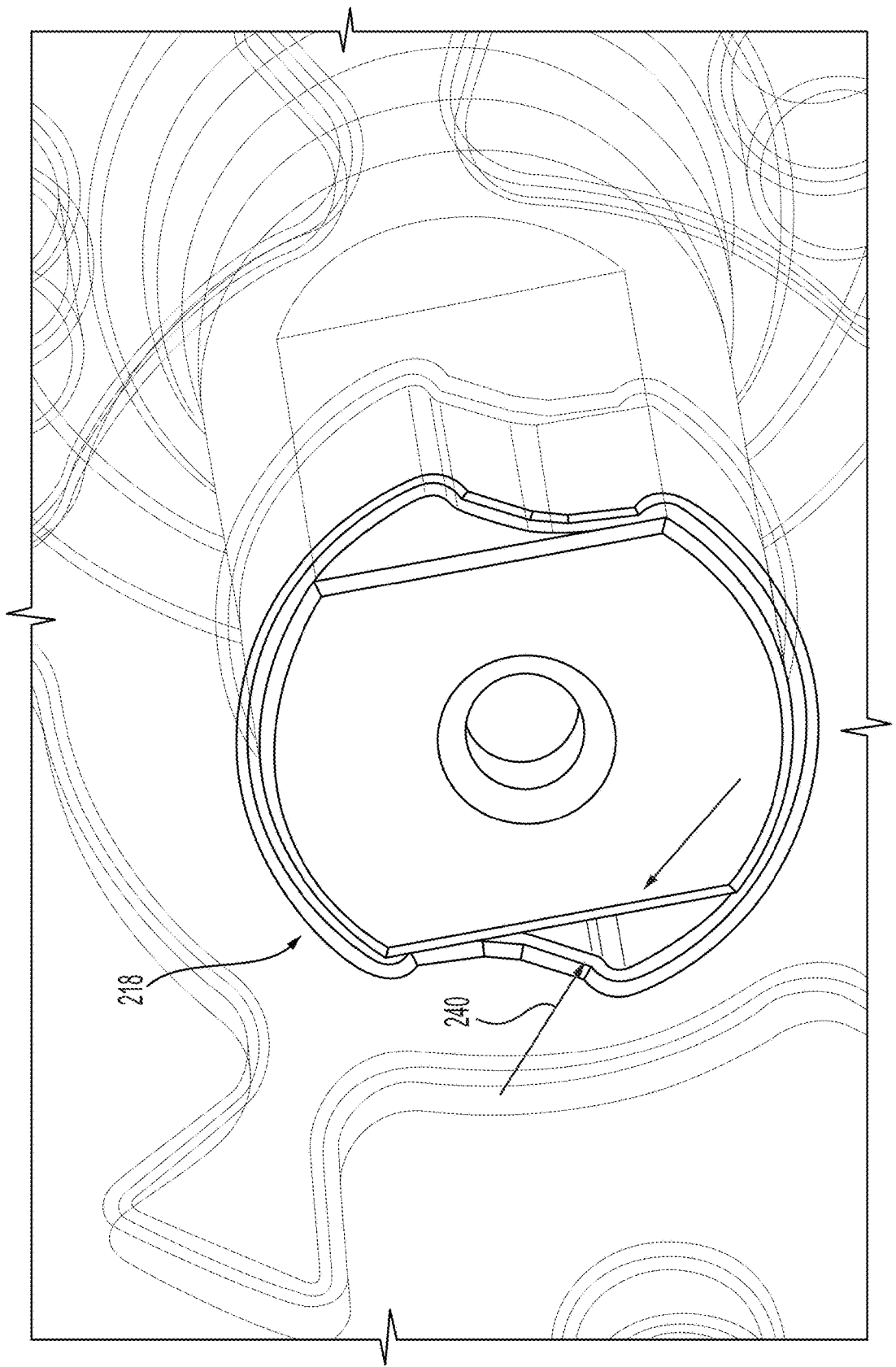

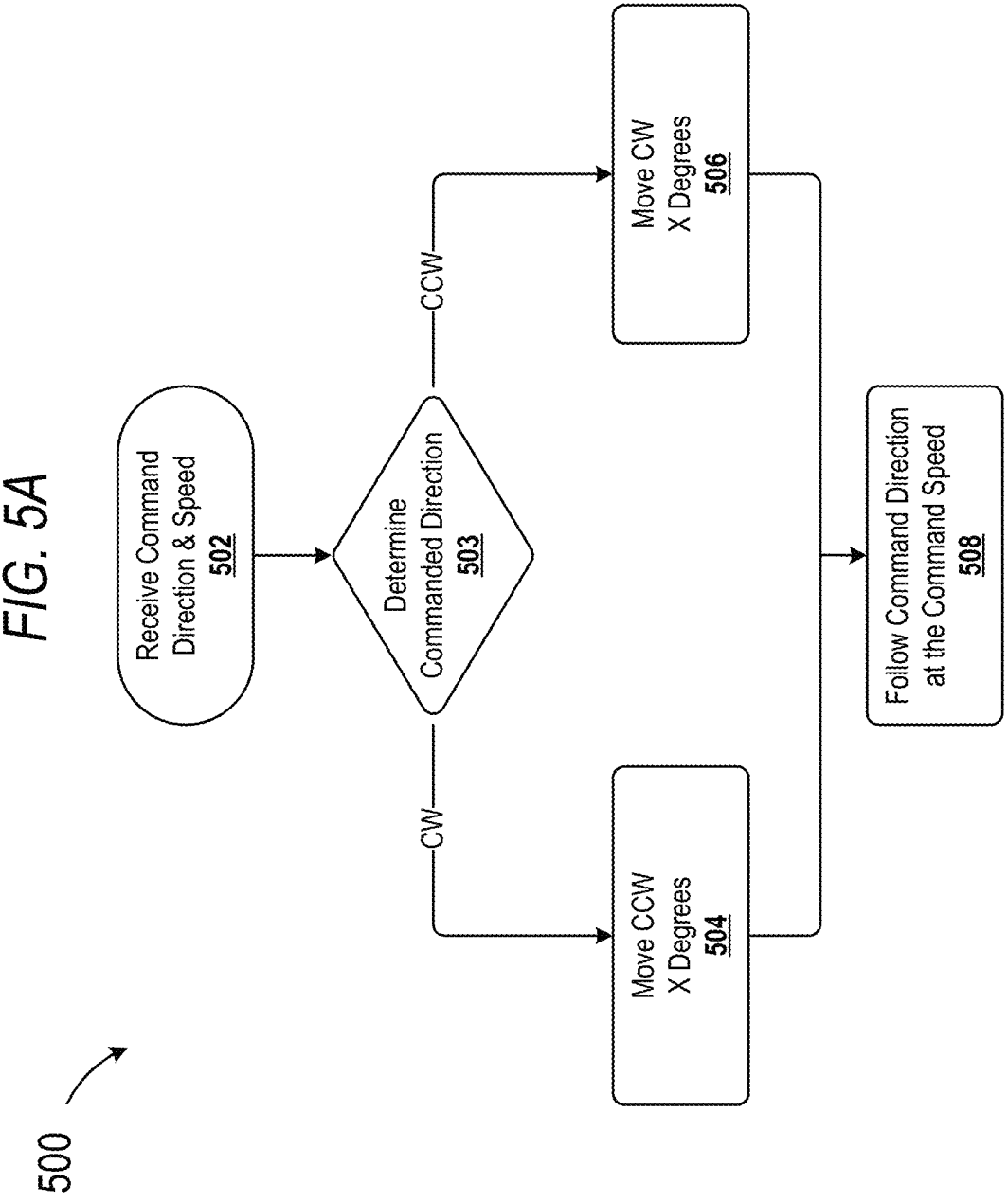

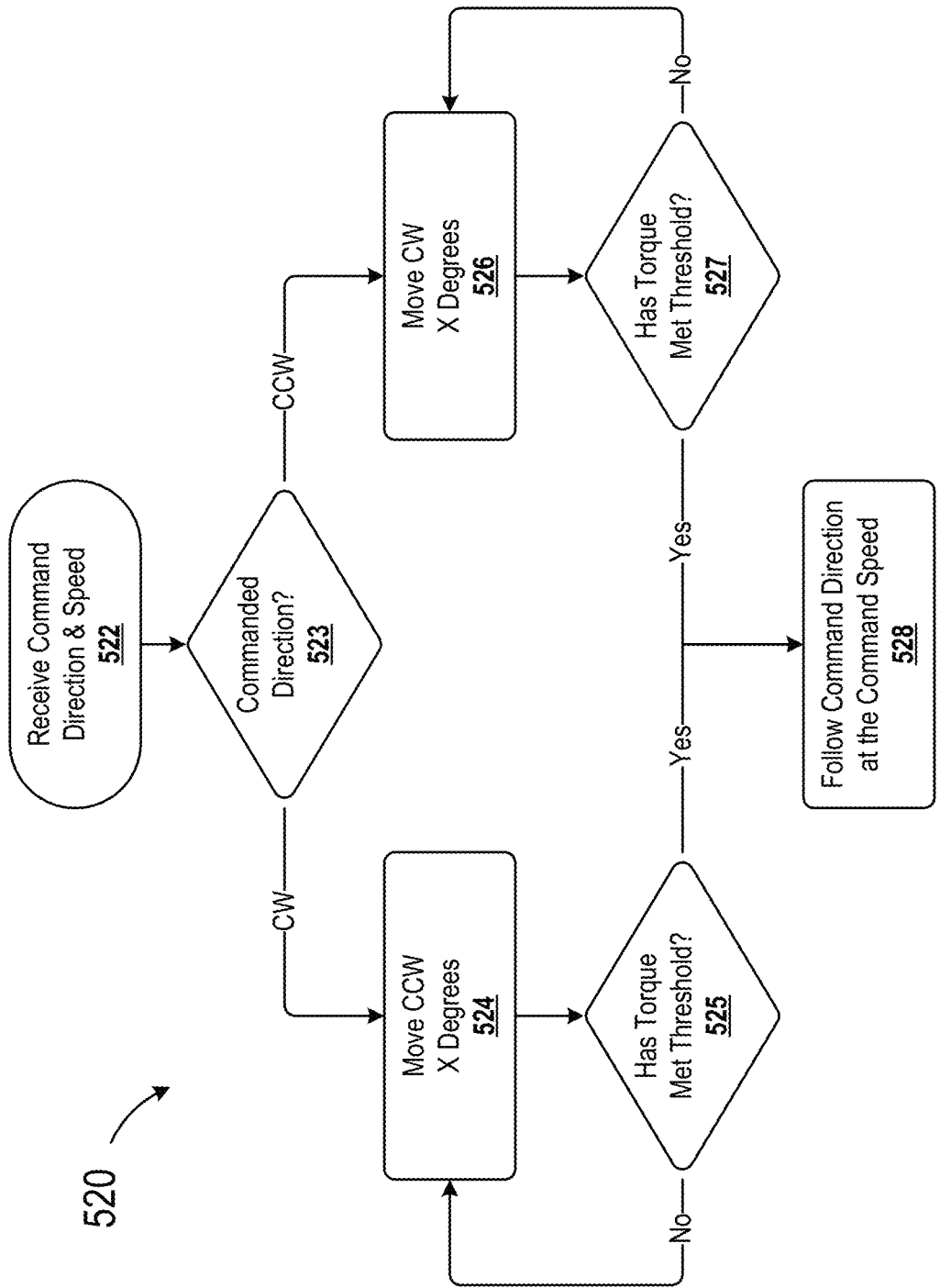

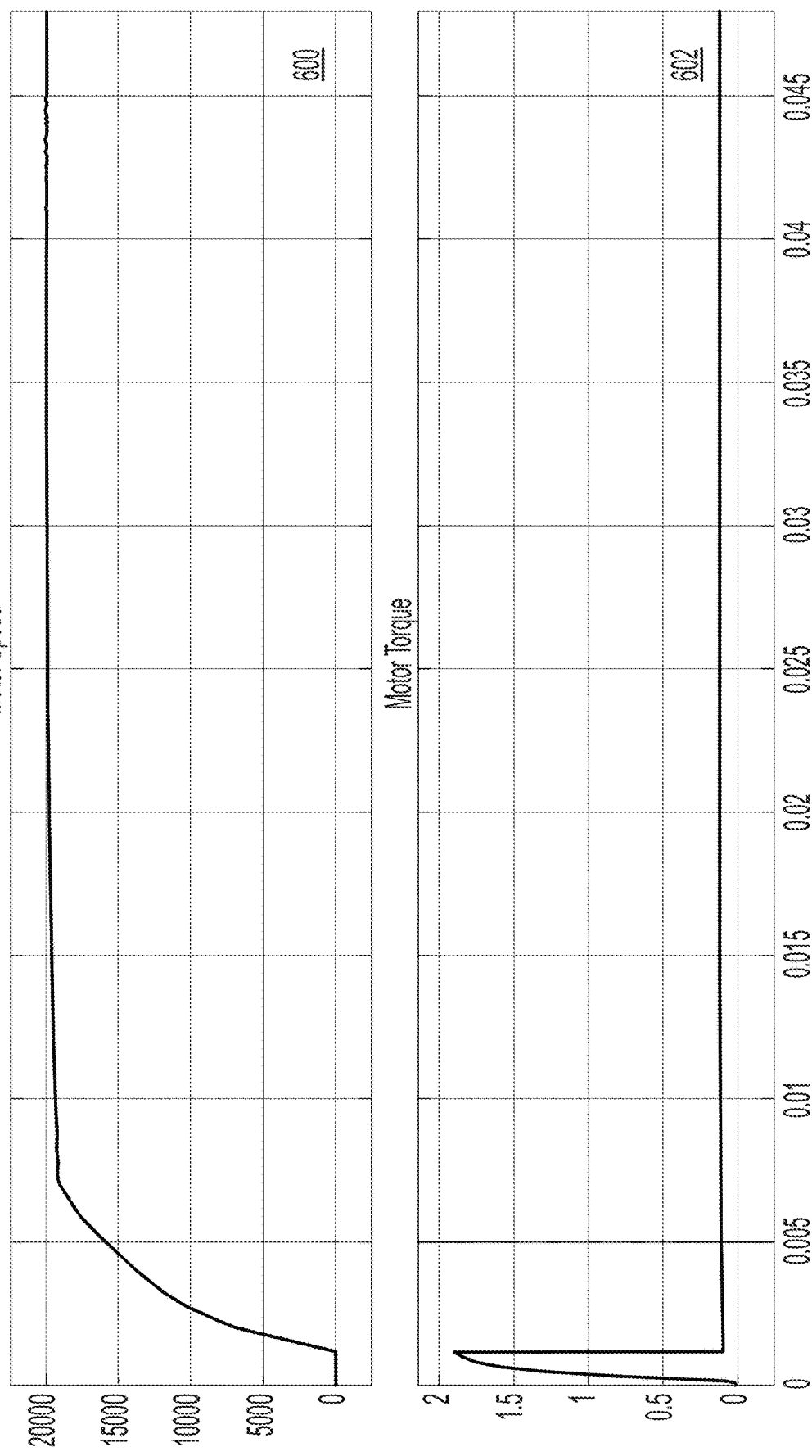

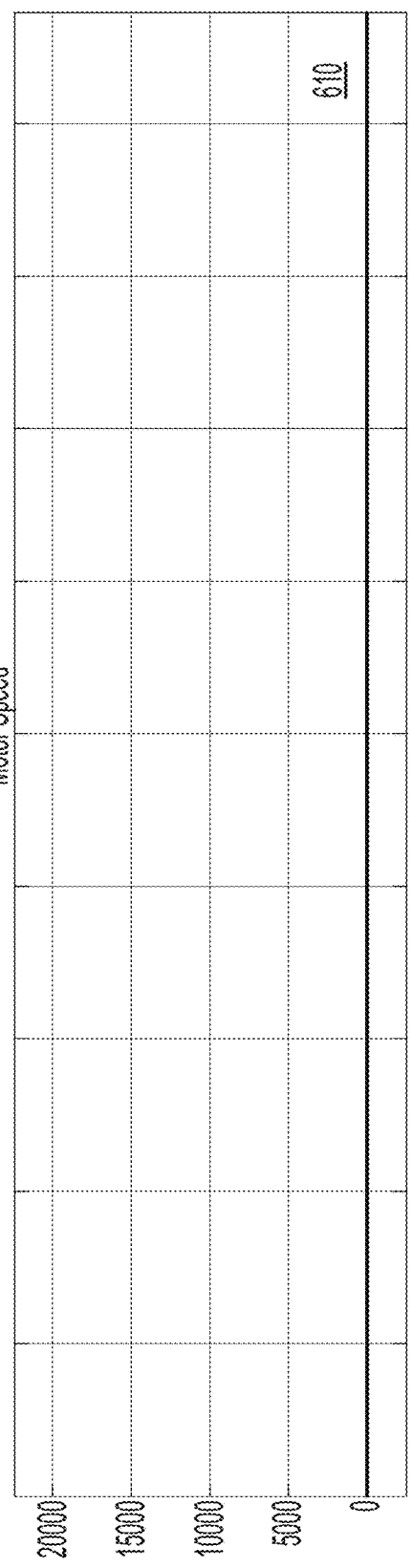
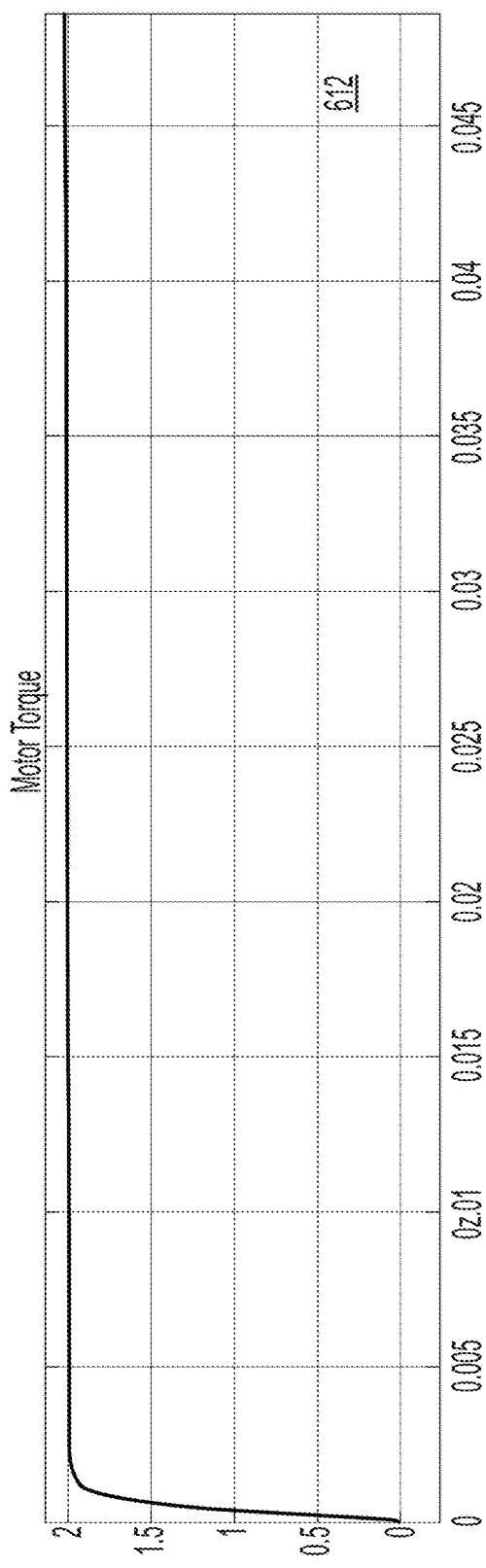
FIG. 6B

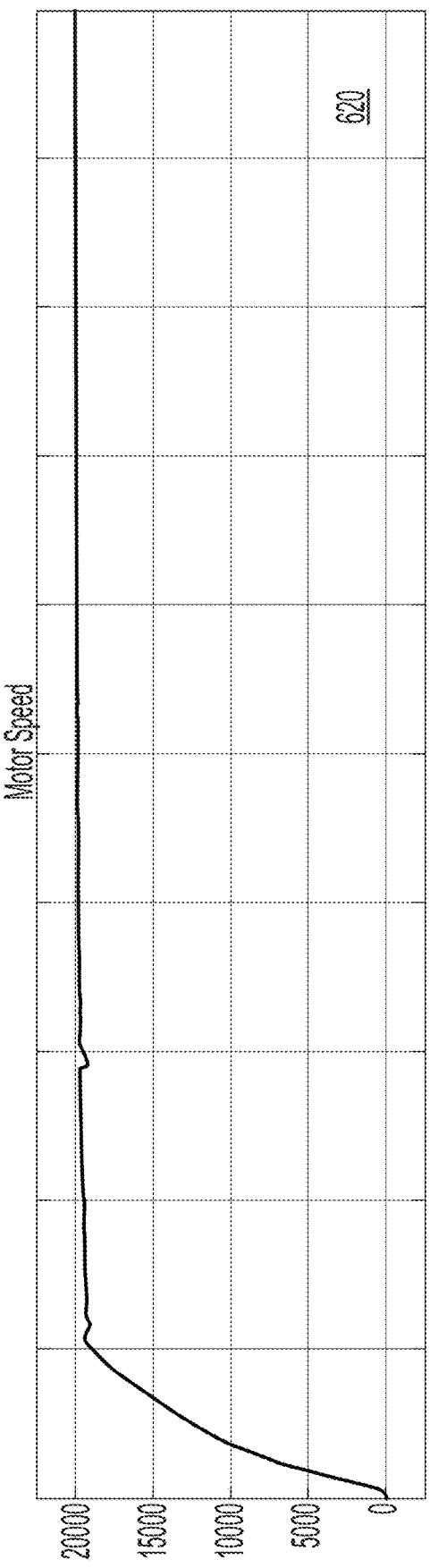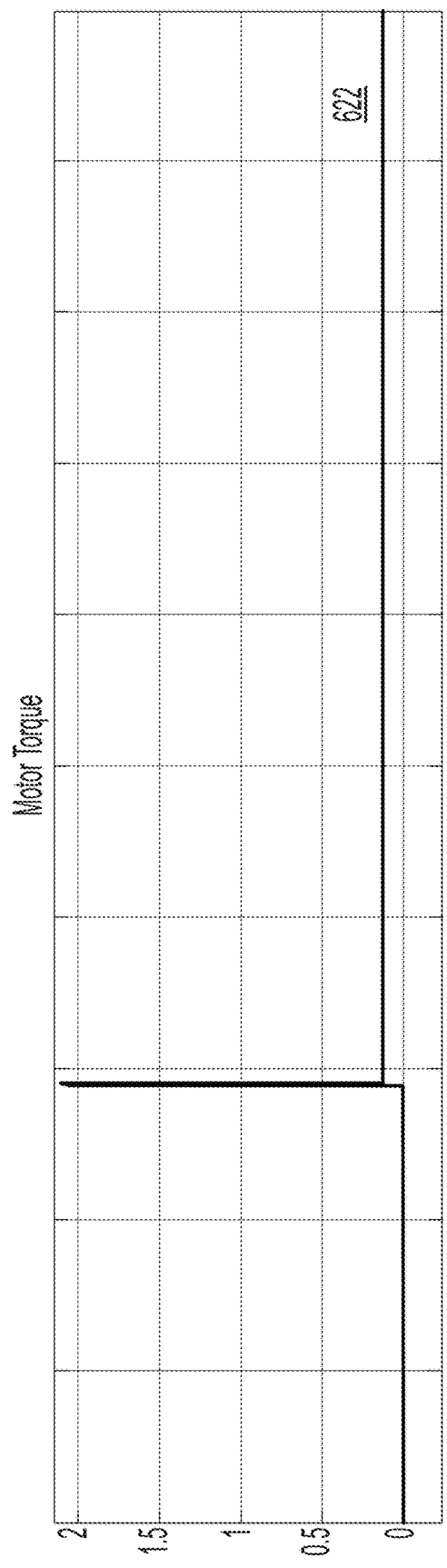
FIG. 6C
Startup stuck at 2.0 Nm motor torque
Motor starts with backlash gears

FIG. 6D
Startup stuck at 2.5 Nm motor torque
Motor starts with backlash gears
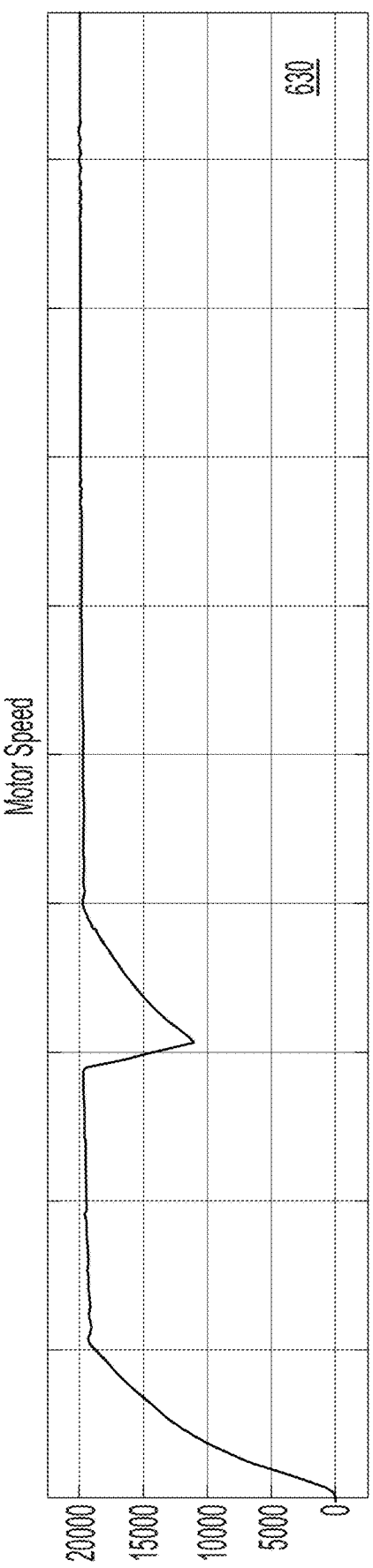
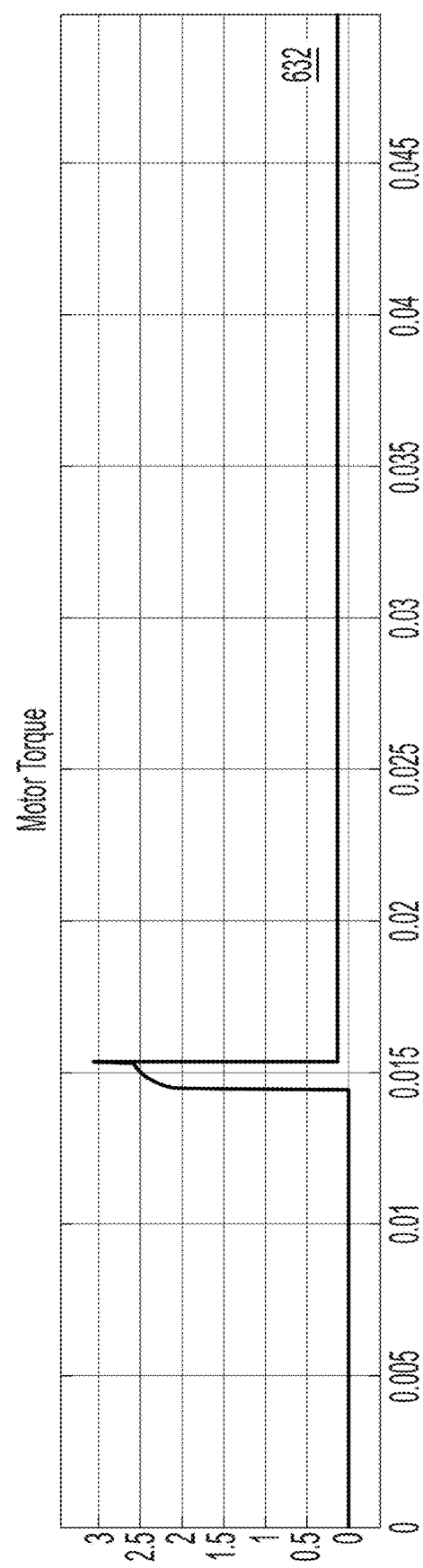

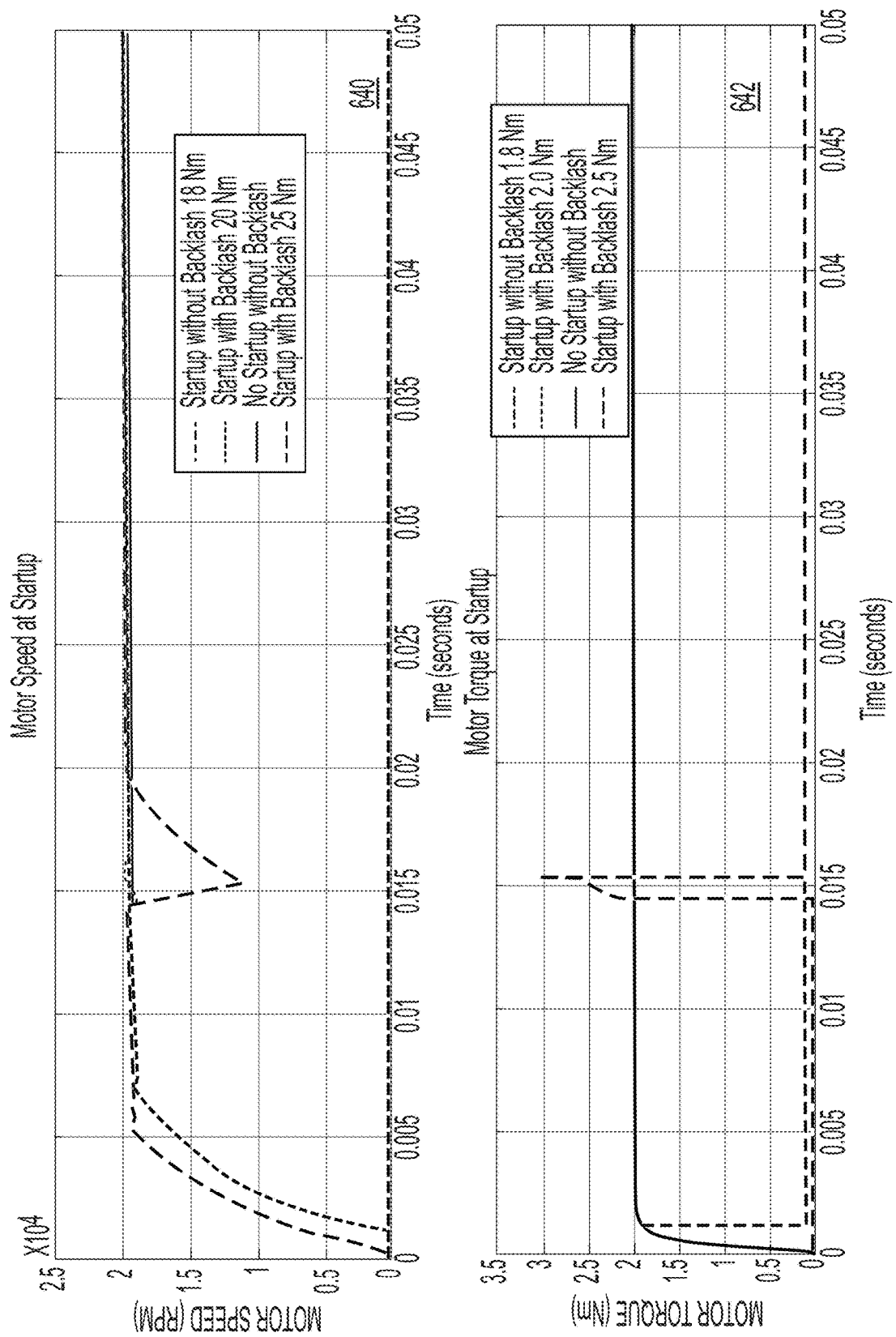

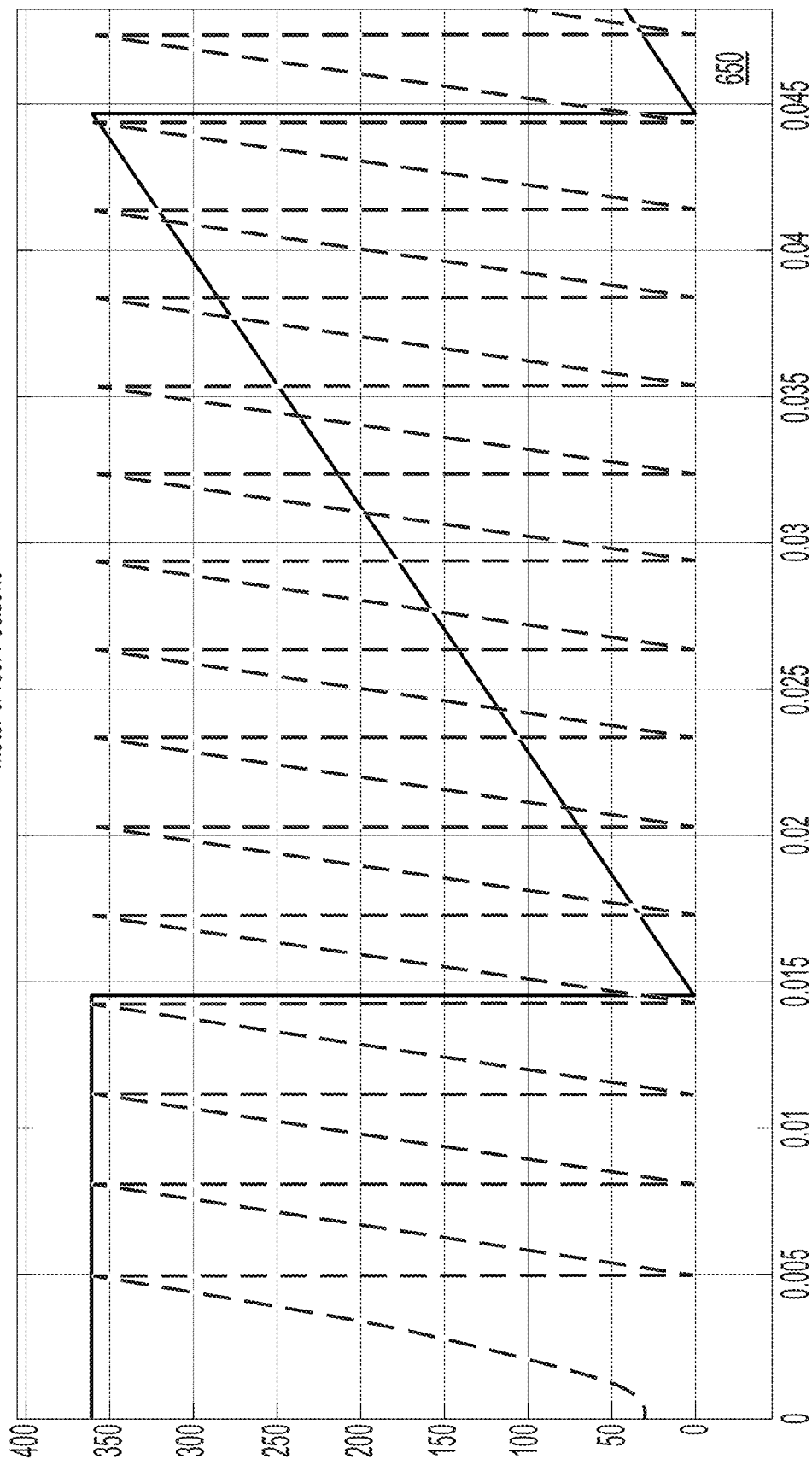

MAXIMUM POWER TOOL STARTUP TORQUE

RELATED APPLICATIONS

This application claims the benefit of U.S. Provisional Patent Application Publication No. 63/244,314, filed Sep. 15, 2021, the entire content of which is hereby incorporated by reference.

SUMMARY

In order to maximize the user benefit in the application of a power tool, it would be beneficial for a power tool to provide high torque impulses near zero speed (e.g., a stall condition). For example, in a drilling application, frequently, an accessory (e.g., drill bit, hole saw, etc.) can become stuck in the workpiece. It is beneficial if the power tool can break the accessory loose by utilizing backlash.

Backlash is present in mechanical systems where the driving member is not directly connected to the load. The most common case occurs with gears, where the output shaft of a gearhead can rotate without the input shaft moving. The loss of contact between teeth at motion inversion causes a backlash gap to open. When this occurs, the load is uncoupled from the motor, and the actuator's torque drives only the components before the backlash. In some cases, backlash arises due to tolerance in manufacturing as the gear teeth need some clearance to avoid jamming or binding when they mesh. For example, a gearhead may have backlash of varying degrees based on the design and quality of the gear. In addition to the need to prevent binding, some backlash occurs in gear systems because of the dimensional tolerances needed for cost-effective manufacturing. Also, backlash can increase with the number of gear stages used on a power tool.

Factors affecting the amount of backlash required in a gear train include errors in profile, pitch, tooth thickness, helix angle and center distance, and run-out. The greater the accuracy the smaller the backlash that is present. Backlash is most commonly created by cutting the teeth deeper into the gears than the ideal depth. Another way of introducing backlash is by increasing the center distances between the gears.

Embodiments of the present disclosure are generally directed to a system to maximize startup torque for a power tool. For example, in some embodiments, a power tool includes a controller that includes a processor and a memory. The controller is coupled to an input and a motor and is configured to receive an input signal from the input, determine an operating direction and an operating speed based on the input signal, cause the motor to rotate a gear train in a direction opposite the operating direction by a predetermined amount or rotation, and cause the motor to rotate in the operating direction at the operating speed. In some embodiments, the predetermined amount is set to increase the amount of backlash in the gear train when the motor operates in the operating direction.

Power tools described herein include a housing, one or more inputs, a gear train, a motor at least partially supported by the housing and coupled to the gear train, and a controller including a processor and a memory. The controller is connected to the one or more inputs and the motor. The controller is configured to receive one or more input signals from the one or more inputs, determine an operating direction and an operating speed based on the one or more input signals, control the motor to rotate the gear train in a direction opposite the operating direction by a predetermined rotation amount, and control the motor to rotate the gear train in the operating direction at the operating speed.

In some aspects, the predetermined rotation amount is set to increase an amount of backlash in the gear train when the motor operates in the operating direction.

In some aspects, the power tools further include a torque sensor associated with the gear train. The controller is further configured to receive, before controlling the motor to rotate in the operating direction, a torque value from the torque sensor, determine whether the torque value is greater than or equal to a threshold torque value, and continue to control the motor to rotate the gear train in the direction opposite the operating direction until the torque value is greater than or equal to the threshold torque value.

In some aspects, the power tools further include an output assembly having an output member. The gear train is configured to transfer torque received from the motor to the output member to cause the output member to rotate about an axis.

In some aspects, the gear train is configured to increase torque transferred to the output member and reduce rotational speed.

In some aspects, the power tools further include a spindle lock configured to prevent some back driving through the gear train but allow torque to be transferred from the motor to the output member through the gear train.

In some aspects, the operating direction and the operating speed are determined based on one or more settings of the one or more inputs.

In some aspects, the power tool is a drill.

In some aspects, the motor is a brushless direct current ("BLDC") motor.

In some aspects, the one or more inputs include a trigger.

Methods of operating a power tool disclosed herein include receiving one or more input signals from one or more inputs, determining an operating direction and an operating speed based on the one or more input signals, controlling a motor to rotate a gear train in a direction opposite the operating direction by a predetermined rotation amount, and controlling the motor to rotate the gear train in the operating direction at the operating speed.

In some aspects, the predetermined rotation amount is set to increase an amount of backlash in the gear train when the motor operates in the operating direction.

In some aspects, the methods further include receiving, before controlling the motor to rotate in the operating direction, a torque value from a torque sensor associated with the gear train, determine whether the torque value is greater than or equal to a threshold torque value, and continue controlling the motor to rotate the gear train in the direction opposite the operating direction until the torque value is greater than or equal to the threshold torque value.

In some aspects, the gear train is configured to transfer torque received from the motor to an output member causing the output member to rotate about an axis.

In some aspects, the gear train is configured to increase torque to the output member and reduce rotational speed.

In some aspects, the methods further include preventing, using a spindle lock, some back driving through the gear train but allowing torque to be transferred from the motor to the output member through the gear train.

In some aspects, the operating direction and the operating speed are determined based on one or more settings of the one or more inputs.

In some aspects, the motor is a brushless direct current ("BLDC") motor.

In some aspects, the one or more inputs includes a trigger.

Power tools described herein include an input, a gear train, a motor coupled to the gear train, and a controller including a processor and a memory. The controller is connected to the input and the motor. The controller is configured to receive an input signal from the input, determine an operating direction based on the input signal, control the motor to rotate the gear train in a direction opposite the operating direction until a torque value meets a threshold torque value, and control the motor to rotate the gear train in the operating direction.

In some embodiments, the power tool includes a torque sensor coupled to the gear train, and the controller is further configured to, before causing the motor to rotate in the operating direction at the operating speed, receive a torque value from the torque sensor, determine whether a torque value has met a threshold torque value, and continue to cause the motor to rotate the gear train in the direction opposite the operating direction until the torque threshold value is met.

In some embodiments, the power tool includes an output assembly having an output member. In some embodiments, the gear assembly is configured to transfer torque received from the motor to the output member causing the output member to rotate about an axis.

In some embodiments, the gear train is configured to increase torque and reduce rotational speed received from the motor to the output member. In some embodiments, the power tool includes a spindle lock that is configured to prevent some back driving through the gear train but allow torque to be transferred from the motor to the output member through the gear assembly.

In some embodiments, the operating direction and the operating speed are determined based on a setting of the input. In some embodiments, the power tool is a drill. In some embodiments, the motor is an electric brushless direct current (DC) motor. In some embodiments, the input is a trigger.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

Before any embodiments are explained in detail, it is to be understood that the disclosure is not limited in their application to the details of construction and the arrangement of components set forth in the following description or illustrated in the following drawings. Aspects of this disclosure are capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected," "supported by," and "coupled" are used broadly and encompass both direct and indirect mounting, connecting and coupling. Further, "connected" and "coupled" are not restricted to physical or mechanical connections or couplings, and can include electrical connections or couplings, whether direct or indirect. As used in this disclosure and the appended claims, the singular forms "a," "an," and "the" include plural references unless the context clearly dictates otherwise. Any reference to "or" herein is intended to encompass "and/or" unless otherwise stated.

It should be noted that a plurality of hardware and software-based devices, as well as a plurality of different structural components may be utilized to implement aspects of this disclosure. Furthermore, and as described in subsequent paragraphs, the specific configurations illustrated in the drawings are intended to exemplify embodiments of the disclosure and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 2A, 2B, 2C, and 2D depict an exemplary embodiment of a power tool that employs maximal startup torque system.

FIGS. 5A and 5B each depict flowcharts illustrating a process for operating the power tool according to the described maximal startup torque system.

FIGS. 6A-6F depicts various graphs showing motor speed and motor torque at start up.

DETAILED DESCRIPTION

Embodiments of the present disclosure are generally directed to a system to maximize startup torque for a power tool to, for example, more consistently achieve advertised torque values or improve the peak stall torque achieved by the power tool. In some embodiments, the described system runs the power tool's motor in the opposite of the present operating direction at startup to maximize the amount backlash (free running) in the operating direction. Employment of the described system creates an impacting effect at startup and allows more peak torque to be achieved at the output of the tool. The described system can be employed in power tools that include both sensor-controlled motors and sensorless-controlled motors.

Figure 1:
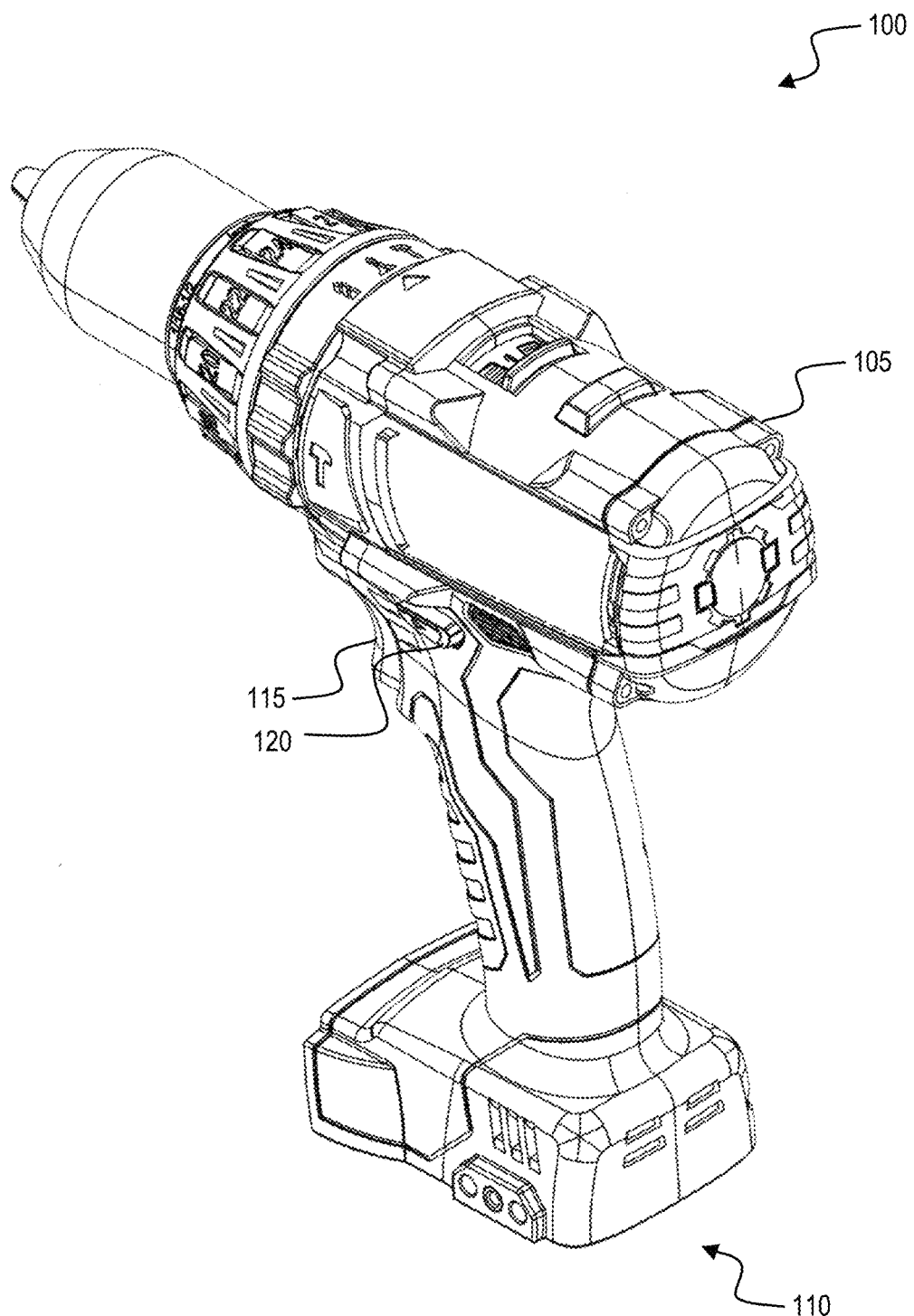
FIG. 1 depicts a power tool according to embodiments described herein.

FIG. 1 illustrates a power tool (e.g., a drill/driver) 100 configured to maximize startup torque. The power tool 100 includes a housing 105 and an interface portion 110 for connecting the power tool 10 to, for example, a battery pack or another device. The power tool 100 also includes a trigger 115 for controlling an output of the power tool and a forward/reverse switch for controlling a direction of rotation of a motor (see FIG. 3).

Figure 2A:
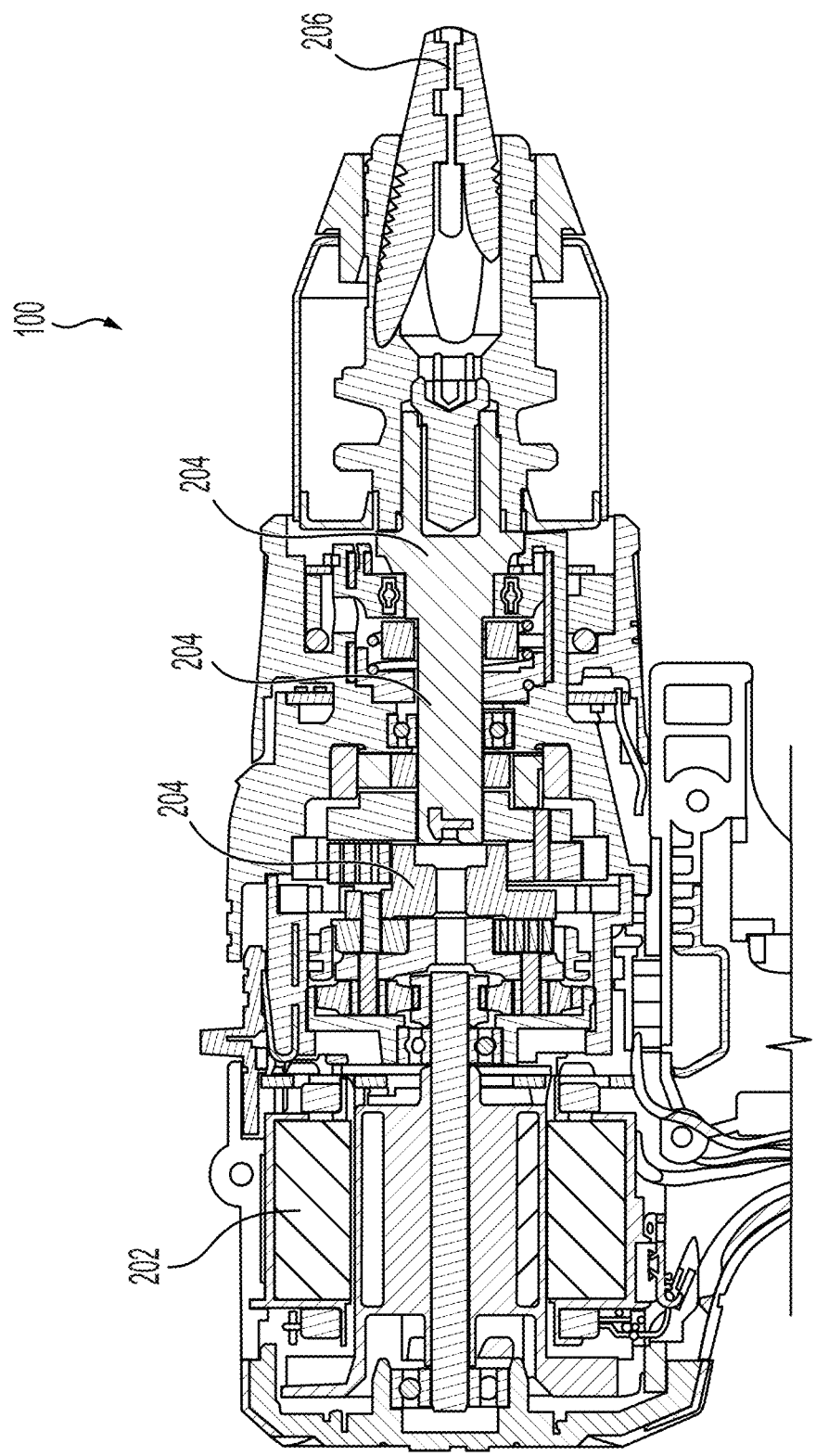

FIGS. 2A-2D depict an example embodiment of the power tool 100 that employs the described maximal startup torque system. As depicted in FIG. 2A, the power tool 100 includes a motor 202, an output 206, and a mechanical system 204 for transferring power generated by the motor 202 to the output 206. The power tool 100 can be any type of power tool as indicated previously that is powered by a motor that employs a mechanical system to transfer the power generated by the motor to the output. Examples of the power tool 200 include, but are not limited to, saws, drills, hammers, wrenches, vacuums, sanders, grinders, routers, joiners, compressors, fasteners, pipe cutters, nailers, staplers, outdoor tools, etc.

In some embodiments, the motor 202 is a machine powered by, for example, electricity from a battery pack. In some embodiments, the motor 202 is an electric brushless direct current ("BLDC") motor.

Figure 2B:
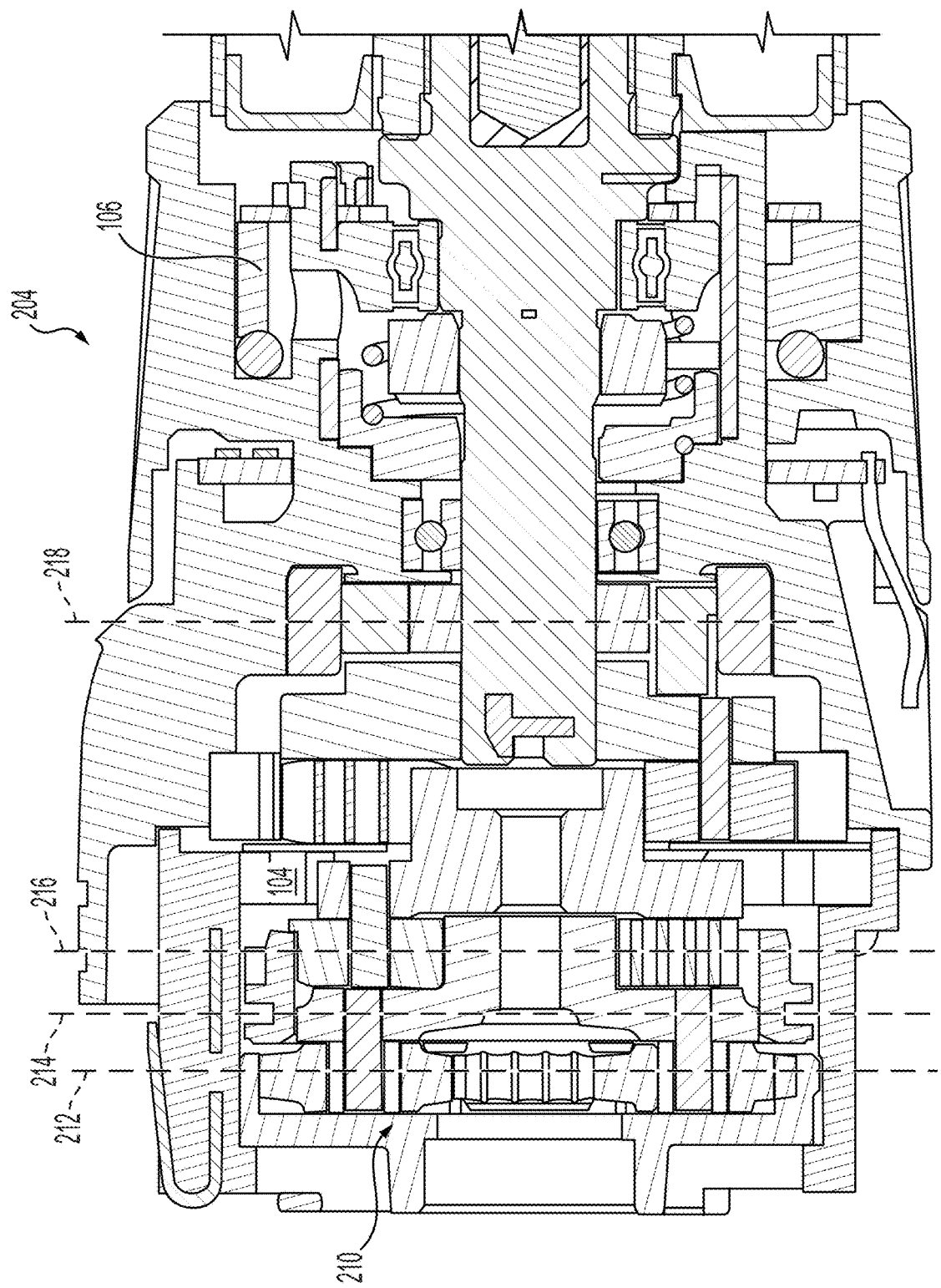

As depicted in FIG. 2B, the mechanical system 204 includes a spindle lock 218 and a gear train 210 (e.g., a planetary gearset) with 3 stages 212, 214, and 216. Accordingly, torque received from the motor 202 is increased by the gear train 210, which also provides a reduced rotational output speed compared to the rotational speed of the motor 202. This output speed is transferred by the mechanical system 204 to the output 206, which is used to perform the various functions of the power tool 200. For example, if the power tool 200 is a drill, the output speed is transferred by the mechanical system 204 to the output 206, which causes the output 206 to rotate about an output axis. In some embodiments, there is an amount of backlash that is designed in each stage (see FIGS. 2A-2B) of the gear train 210 to allow for assembly and proper functioning of the gears. For example, one to two degrees of rotation may be designed in each stage of the gear train 210.

FIG. 2C depicts an example gear system 230 that includes gears 232 and 234. The gear system 230 shows gear backlash 236, which includes the space between teeth measured at the pitch circle. (e.g., the distance between the involutes of the mating gear teeth).

FIG. 2D illustrates the spindle lock 218 in greater detail. As illustrated, the spindle lock 218 is designed to prevent back driving through the system (e.g., from the spindle to motor 202), but allow torque to be transferred from the motor side to the spindle side. For proper function, there is built in rotation 240 (e.g., 10 to 30 degrees of rotation) that is permitted within the mechanical system. This permitted rotation of the spindle lock is greater than the backlash in the gear train 210. As a result, the motor 202 can be rotated in the opposite direction of its intended rotation direction to take up the backlash before rotating in the intended direction to produce greater output torque. In some embodiments, both the spindle lock 218 and the gearing backlash account for free rotation in the mechanical system 204.

Figure 3:
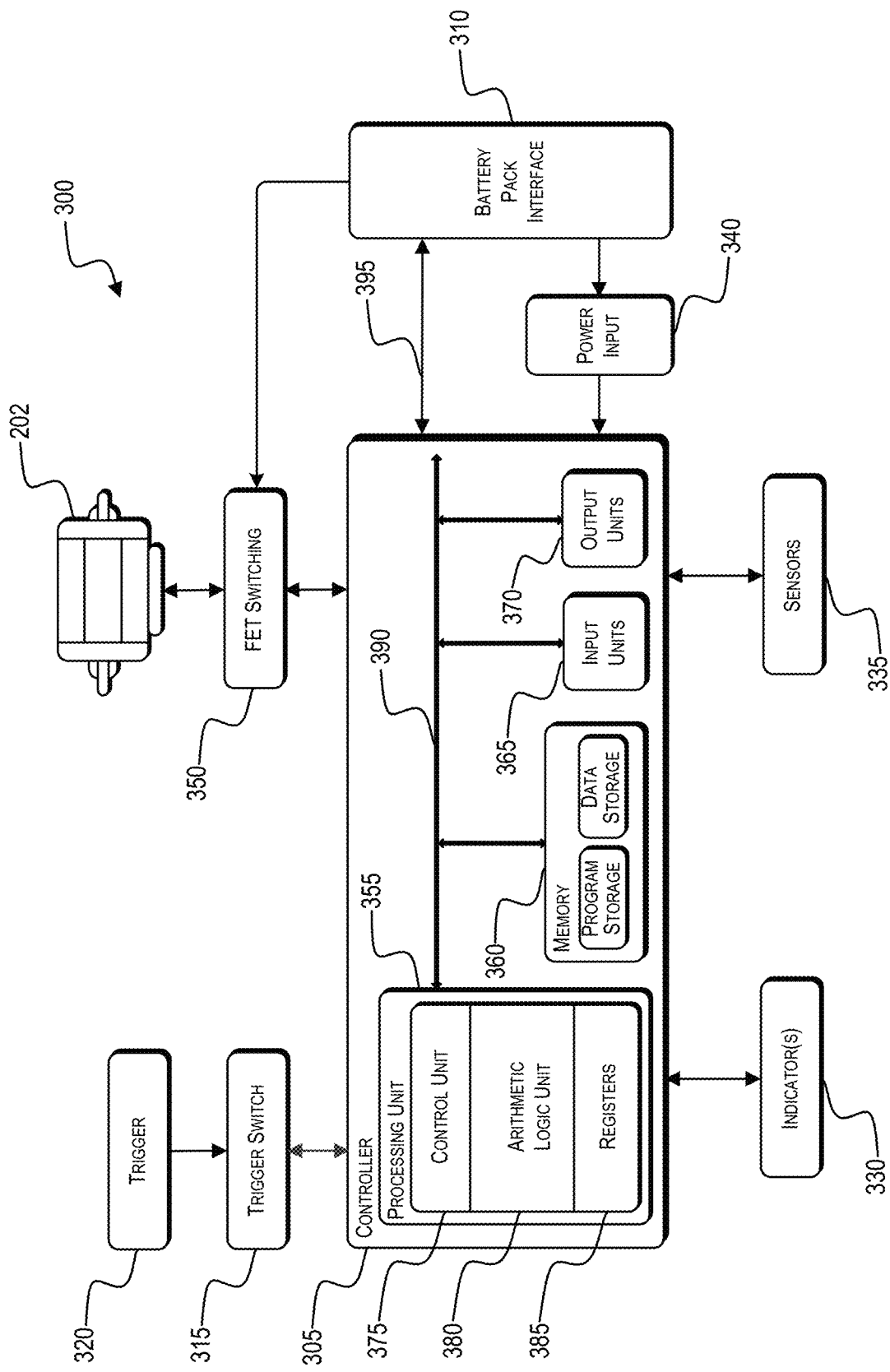
FIG. 3 depicts a control system for the power tool.

FIG. 3 depicts a control system 300 for the power tool 100. The control system 300 includes a controller 305. The controller 305 is electrically or communicatively connected to a variety of modules or components of the power tool 100. For example, the illustrated controller 305 is electrically connected to the motor 202, a battery pack interface 310, a trigger switch 315 (connected to a trigger 320), one or more indicators 330, one or more sensors 335, a power input module 340, and a FET switching module 350 (e.g., including a plurality of switching FETs). The controller 305 includes combinations of hardware and software that are operable to, among other things, control the operation of the power tool 100, monitor the operation of the power tool 100, activate the one or more indicators 330 (e.g., an LED), etc. For example, the controller 305 can be configured to implement various aspects of the described maximal startup torque system.

The controller 305 includes a plurality of electrical and electronic components that provide power, operational control, and protection to the components and modules within the controller 305 or the power tool 100. For example, the controller 305 includes, among other things, a processing unit 355 (e.g., a microprocessor, a microcontroller, an electronic processor, and electronic controller, or another suitable programmable device), a memory 360, input units 365, and output units 370. The processing unit 355 includes, among other things, a control unit 375, an arithmetic logic unit ("ALU") 380, and a plurality of registers 385 (shown as a group of registers in FIG. 3), and is implemented using a known computer architecture (e.g., a modified Harvard architecture, a von Neumann architecture, etc.). The processing unit 355, the memory 360, the input units 365, and the output units 370, as well as the various modules or circuits connected to the controller 305 are connected by one or more control or data buses (e.g., common bus 390). The control or data buses are shown generally in FIG. 3 for illustrative purposes. The use of one or more control or data buses for the interconnection between and communication among the various modules, circuits, and components would be known to a person skilled in the art in view of the disclosure described herein.

The memory 360 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 355 is connected to the memory 360 and executes software instructions that are capable of being stored in a RAM of the memory 360 (e.g., during execution), a ROM of the memory 360 (e.g., on a generally permanent basis), or another non-transitory computer readable medium such as another memory or a disc. Software included in the implementation of the power tool 100 can be stored in the memory 360 of the controller 305. The software includes, for example, firmware, one or more applications, program data, filters, rules, one or more program modules, and other executable instructions. The controller 305 is configured to retrieve from the memory 360 and execute, among other things, instructions related to the control processes and methods described herein. In other constructions, the controller 305 includes additional, fewer, or different components.

The battery pack interface 310 includes a combination of mechanical components (e.g., rails, grooves, latches, etc.) and electrical components (e.g., one or more terminals) configured to and operable for interfacing (e.g., mechanically, electrically, and communicatively connecting) the power tool 100 with a battery pack. For example, power provided by the battery pack to the power tool 100 is provided through the battery pack interface 310 to the power input module 340. The power input module 340 includes combinations of active and passive components to regulate or control the power received from the battery pack prior to power being provided to the controller 305. The battery pack interface 310 also supplies power to the FET switching module 350 to be switched by the switching FETs to selectively provide power to the motor 202. The battery pack interface 310 also includes, for example, a communication line 395 for providing a communication line or link between the controller 305 and the battery pack.

The indicators 330 include, for example, one or more light-emitting diodes ("LEDs"). The indicators 330 can be configured to display conditions of, or information associated with, the power tool 100. For example, the indicators 330 are configured to indicate measured electrical characteristics of the power tool 100, the status of the power tool 100, etc. The sensors 335 include, for example, voltage sensors, current sensors, temperature sensors, torque sensors (e.g., associated with the operation of the gear train 210), etc.

Figure 4A:
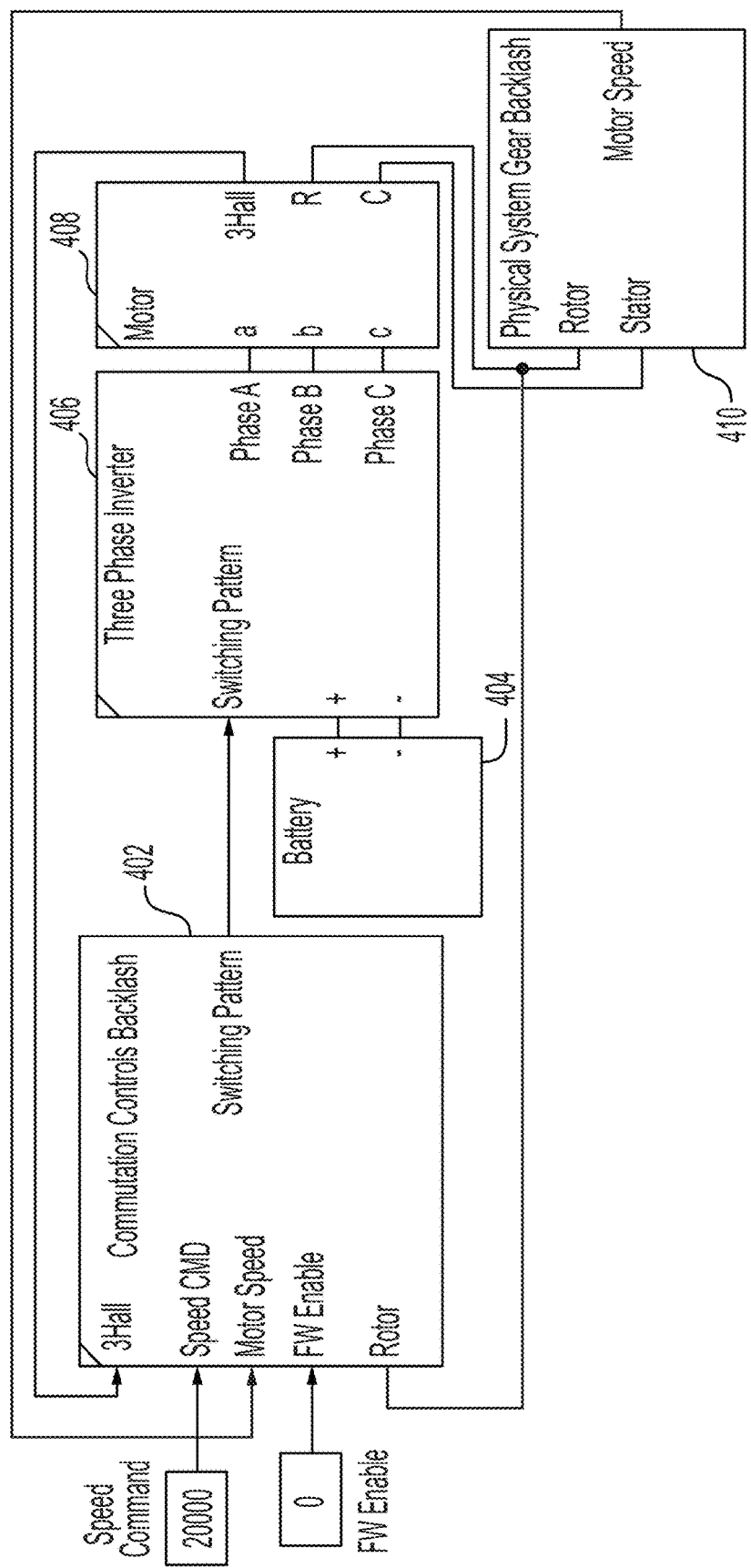
FIGS. 4A and 4B depicts a model-based design for gear backlash breakout within the .described maximal startup torque system.
Figure 4B:
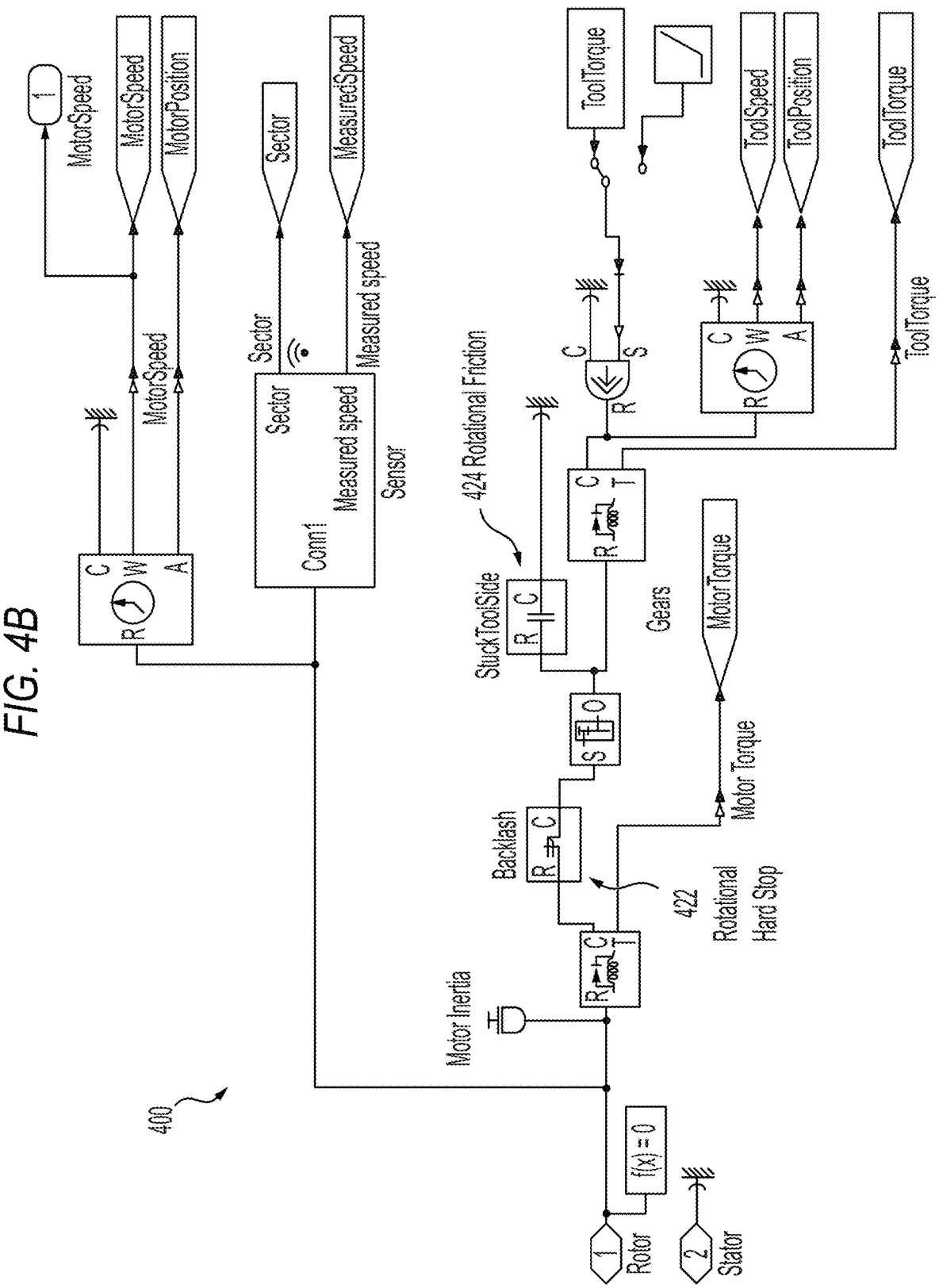

FIGS. 4A and 4B depict a model-based design 400 for gear backlash breakout within the described maximal startup torque system. The model-based design 400 is a signal-level diagram of the power tool 100 as implemented using the controller 305 of FIG. 3. The model includes a commutation module 402, a battery pack 404 (e.g., connected to the battery pack interface 310), an inverter module 406 (e.g., corresponding to FET switching module 350), a motor 408 (e.g., corresponding to motor 202), and a feedback module 410. Power is provided from the battery pack 404 to the inverter module 406, as illustrated in FIG. 3. The inverter module 406 is connected to the motor 408 (e.g., a brushless DC motor) for powering three phases of the motor 408 (i.e., phase A, phase B, and phase C). The rotation of the motor 408 is monitored by the feedback module 410. In some embodiments, the feedback module 410 corresponds to a plurality of Hall effect sensors for sensing the rotation of rotor permanent magnets. In other embodiments, the feedback module 410 corresponds to sensorless motor control where, for example, a back electromotive force, a phase current, phase voltages, etc., are monitored. In some embodiments, Hall effect sensors are separate from the feedback module 410 and separately provide signals to the commutation module 402. The feedback module 410 outputs motor speed and/or position information to the commutation module 402. The commutation module 402 also receives a commanded speed for the power tool 100 (e.g., based on the trigger 320) and a FORWARD/REVERSE signal (e.g., from the forward reverse switch 120). The FORWARD/REVERSE signal indicates to the commutation module 402 the present intended rotational direction of the motor 408. The commutation module 402 outputs control signals to the inverter bridge to control the rotation of the motor. For example, the motor 408 can be controlled on the opposite direction of rotation to the intended direction of rotation in order to take up the backlash in the gear train 210. The motor 408 can then be controlled in the intended direction such that the gears of the gear train can build up speed before the backlash is exhausted and the mating gear teeth contact one another. By utilizing the backlash, a greater torque can be imparted to the output 206 of the power tool 100 (e.g., at low speeds). Such control creates an impacting action that can be used to, for example, break through a stall condition of the power tool 100 when the output 206 (e.g., with a bit) is stuck in a work surface.

With reference to FIG. 4B, the model-based design 400 of the power tool 100 is illustrated in greater detail. Specifically, FIG. 4B illustrates a mechanical model of the power tool 100 to demonstrate the use of backlash. A rotational hard stop block 422 represents a mechanical rotational hard stop that restricts motion of a body between upper and lower bounds (e.g., simulating the backlash in the gear train 210). The stop is implemented as a spring and damper that comes into contact with a slider at the bounds. The hard stop model can apply full stiffness and damping at the bounds of the torques and can be applied smoothly through a transition region. Connectors R and C are mechanical rotational conserving ports. The hard stop block 422 is oriented from R to C. This means that the hard stop block 422 transmits torque from port R to port C when the gap is closed in the positive direction.

A rotational friction block 324 represents friction in the contact between rotating bodies (e.g., gears of the gear train 210). The friction force is simulated as a function of relative velocity and assumed to be the sum of friction sources. The sum of the friction forces at zero velocity is often referred to as the "breakaway friction." Connections R and C are mechanical rotational conserving ports. The block positive direction is from port R to port C. In some embodiments, if port R's velocity is greater than that of port C, the block transmits torque from port R to port C (e.g., transferring torque from one gear of the gear train 210 to the next gear of the gear train 210).

The above modules of the power tool 100 reproduce the effects of using backlash to increase the torque of the power tool 100. FIGS. 5A and 5B each depict a flowchart illustrating a process 500 and 520, respectively, for operating the power tool 100 according to the described maximal startup torque system. For clarity of presentation, the description that follows generally describes the processes 500 and 520 in the context of FIGS. 1-4B. In some embodiments, the processes 500 and 520 are executed by processing unit 355 of the control system 300 as described above with respect to FIG. 3. In some embodiments, the processes 500 and 520, depicted in FIGS. 5A and 5B, are executed by a power tool without sensors (e.g., without Hall effect sensors for detecting motor position). In some embodiments, the processes 500 and 520, depicted in FIGS. 5A and 5B, are executed by a power tool with sensors (e.g., Hall effect sensors for detecting motor position). However, it will be understood that the processes 500 and 520 may be performed, for example, by any other suitable system or a combination of systems as appropriate.

For the process 500 depicted in FIG. 5A, at step 502 an input indicating that the power tool 200 is ready to begin operation is received (e.g., a signal is received from an input such as a trigger 320). At decision 503, an operating direction and an operating speed are determined by the controller 305. In some embodiments, the operating direction and speed are determined based on the received input. In some embodiments, the operating direction and the operating speed are determined based on a setting of an input (e.g., a switch set to indicate a direction [e.g., switch 120] or speed, the depth to which the trigger 320 is depressed, etc.). As depicted, the operating direction is determined as rotating the output in either a forward or clockwise ("CW") direction (e.g., a first direction) or a reverse or counter clockwise ("CCW") direction (e.g., a second direction). When the operating direction is determined as CW, at step 504, the motor is run in the CCW direction to rotate the gear train maximizing the amount of backlash in the CW direction. Alternatively, when the operating direction is determined as CCW, at step 506, the motor is run in the CW direction to rotate the gear train maximizing the amount of backlash in the CCW direction. For example, in some embodiments, the gear train is rotated at steps 505 and 506 a predetermined amount (e.g., 1-2 degrees per stage of gear train 210) based on the design and function of the power tool 100. At step 508, the motor is engaged in the received operating direction at the received command speed to exhaust the available backlash in that direction. This action can be repeated until, for example, a predetermined about of time has elapsed, a predetermined number of impacts have occurred, a stall condition has been cleared, etc.

For the process 520 depicted in FIG. 5B, at step 522 an input indicating that the power tool 200 is ready to begin operation is received. At decision 523, an operating direction and and an operating speed are determined by the controller 305. When the operating direction is determined as forward or CW, at step 524, the motor is run in the CCW direction to rotate the gear train. At decision 525, the torque determined as the motor is run in the CCW direction until it meets a set threshold (e.g., indicating that all of the backlash has been taken up). Once the torque meets the set threshold, the process 520 proceeds to step 528. Alternatively, when the operating direction is determined as reverse or CCW, at step 526, the motor is run in the CW direction to rotate the gear train. At decision 527, the torque determined as the motor is run in the CW direction until it meets the set threshold. Again, once the torque meets the set threshold, the process 520 proceeds to step 528. At step 528, the motor is engaged in the received operating direction at the received command speed to exhaust the available backlash in that direction. This action can be repeated until, for example, a predetermined about of time has elapsed, a predetermined number of impacts have occurred, a stall condition has been cleared, etc.

FIGS. 6A-6F depict various graphs showing motor speed and motor torque at startup of the power tool 100.

FIG. 6A depicts graphs 600 and 602 showing motor speed and motor torque, respectively, for normal startup stuck at 1.8 Newton meters ("Nm") of motor torque.

FIG. 6B depicts graphs 610 and 612 showing motor speed and motor torque respectively for startup stuck at 2.0 Nm motor torque, where the motor does not start.

FIG. 6C depicts graphs 620 and 622 showing motor speed and motor torque respectively for startup stuck at 2.0 Nm motor torque, where the motor starts with backlash being utilized in the gear train 210 to increase torque.

FIG. 6D depicts graphs 630 and 632 showing motor speed and motor torque respectively for startup stuck at 2.5 Nm motor torque, where the motor starts with backlash being utilized in the gear train 210 to increase torque.

FIG. 6E depicts graphs 640 and 642 showing motor speed and motor torque respectively for graphs showing motor speed and motor torque at start up. Each graph shows: (1) Startup without Backlash at 1.8 Nm motor torque; (2) Startup with Backlash at 2.0 Nm motor torque; (3) No startup without Backlash; and (4) Startup with Backlash at 2.5 Nm motor torque.

FIG. 6F depicts a graph 650 showing motor and tool positions with delayed tool side start.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Moreover, the separation or integration of various system modules and components in the implementations described earlier should not be understood as requiring such separation or integration in all implementations, and it should be understood that the described components and systems can generally be integrated together in a single product or packaged into multiple products. Accordingly, the earlier description of example embodiments does not define or constrain this disclosure. Other changes, substitutions, and alterations are also possible without departing from the spirit and scope of this disclosure.

Thus, this description provides, among other things, a power tool configured to run a motor in a direction opposite an operating direction at startup to maximize the amount of backlash in the operating direction.

What is claimed is:

1. A power tool comprising:
   a housing;
   one or more inputs;
   a gear train;
   a motor at least partially supported by the housing and coupled to the gear train; and
   a controller including a processor and a memory, the controller connected to the one or more inputs and the motor, the controller configured to:
   receive one or more input signals from the one or more inputs,
   determine an operating direction and an operating speed based on the one or more input signals,
   control the motor to rotate the gear train in a direction opposite the operating direction by a predetermined rotation amount, and
   control the motor to rotate the gear train in the operating direction at the operating speed.

2. The power tool of claim 1, wherein the predetermined rotation amount is set to increase an amount of backlash in the gear train when the motor operates in the operating direction.

3. The power tool of claim 1, further comprising:
   a torque sensor associated with the gear train, wherein the controller is further configured to:
   receive, before controlling the motor to rotate in the operating direction, a torque value from the torque sensor,
   determine whether the torque value is greater than or equal to a threshold torque value, and
   continue to control the motor to rotate the gear train in the direction opposite the operating direction until the torque value is greater than or equal to the threshold torque value.

4. The power tool of claim 1, further comprising:
   an output assembly having an output member, wherein the gear train is configured to transfer torque received from the motor to the output member to cause the output member to rotate about an axis.

5. The power tool of claim 4, wherein the gear train is configured to increase torque transferred to the output member and reduce rotational speed.

6. The power tool of claim 5, further comprising:
   a spindle lock configured to prevent some back driving through the gear train but allow torque to be transferred from the motor to the output member through the gear train.

7. The power tool of claim 1, wherein the operating direction and the operating speed are determined based on one or more settings of the one or more inputs.

8. The power tool of claim 1, wherein the power tool is a drill.

9. The power tool of claim 1, wherein the motor is a brushless direct current ("BLDC") motor.

10. The power tool of claim 1, wherein the one or more inputs include a trigger.

11. A method of operating a power tool, the method comprising:

receiving one or more input signals from one or more inputs;

determining an operating direction and an operating speed based on the one or more input signals;

controlling a motor to rotate a gear train in a direction opposite the operating direction by a predetermined rotation amount; and controlling the motor to rotate the gear train in the operating direction at the operating speed.

12. The method of claim 11, wherein the predetermined rotation amount is set to increase an amount of backlash in the gear train when the motor operates in the operating direction.

13. The method of claim 11, further comprising:

receiving, before controlling the motor to rotate in the operating direction, a torque value from a torque sensor associated with the gear train;

determine whether the torque value is greater than or equal to a threshold torque value; and continue controlling the motor to rotate the gear train in the direction opposite the operating direction until the torque value is greater than or equal to the threshold torque value.

14. The method of claim 11, wherein the gear train is configured to transfer torque received from the motor to an output member causing the output member to rotate about an axis.

15. The method of claim 14, wherein the gear train is configured to increase torque to the output member and reduce rotational speed.

16. The method of claim 15, further comprising:

preventing, using a spindle lock, some back driving through the gear train but allowing torque to be transferred from the motor to the output member through the gear train.

17. The method of claim 11, wherein the operating direction and the operating speed are determined based on one or more settings of the one or more inputs.

18. The method of claim 11, wherein the motor is a brushless direct current ("BLDC") motor.

19. The method of claim 11, wherein the one or more inputs includes a trigger.

20. A power tool comprising:

an input;

a gear train;

a motor coupled to the gear train; and a controller including a processor and a memory, the controller connected to the input and the motor, the controller configured to:

receive an input signal from the input, determine an operating direction based on the input signal, control the motor to rotate the gear train in a direction opposite the operating direction until a torque value meets a threshold torque value, and control the motor to rotate the gear train in the operating direction.

* * * * *